Feb. 27, 1940.    M. E. R. BERNARDON    2,191,950
TRACTOR WHEEL
Filed Nov. 2, 1937    2 Sheets-Sheet 1
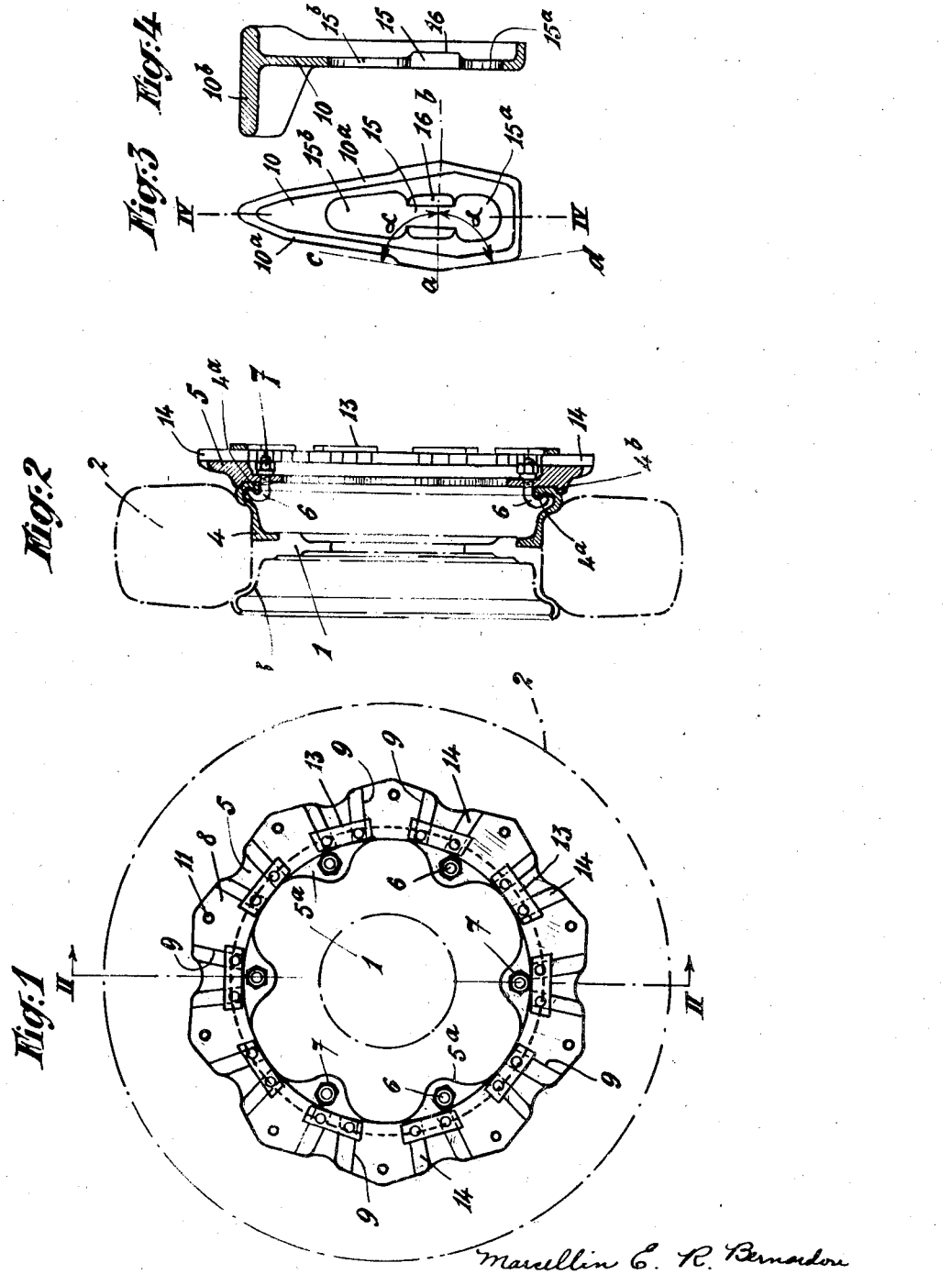

Feb. 27, 1940.  M. E. R. BERNARDON  2,191,950
TRACTOR WHEEL
Filed Nov. 2, 1937   2 Sheets-Sheet 2
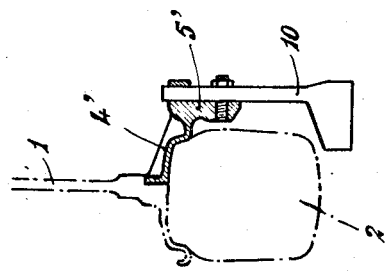
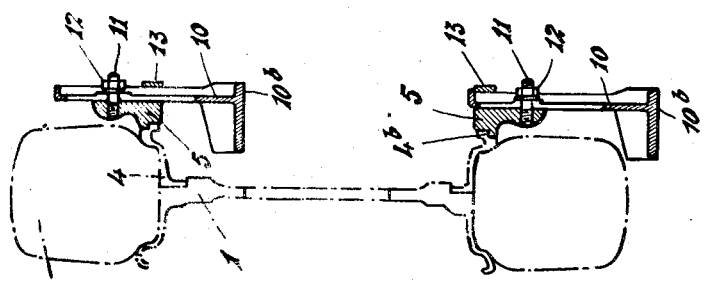
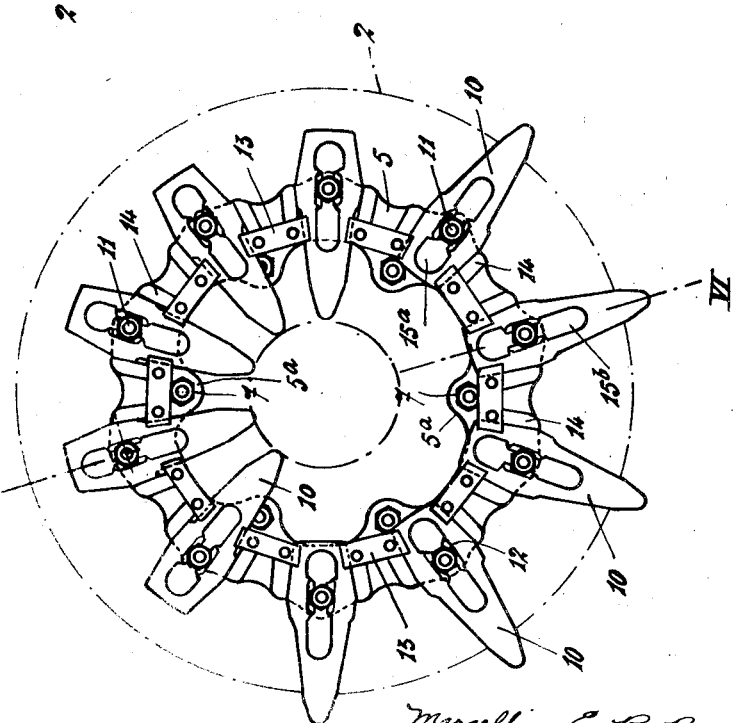

Patented Feb. 27, 1940

2,191,950

UNITED STATES PATENT OFFICE 2,191,950

TRACTOR WHEEL

Marcellin Eugène René Bernardon, Paris, France, assignor to Societe Anonyme des Pneumatiques Dunlop, Paris, France, a company of France Application November 2, 1937, Serial No. 172,479
In France November 7, 1936

4 Claims. (Cl. 301—50)

The present invention relates to vehicle wheels and more especially, although not exclusively, to the wheels of tractors which are to move on soft or broken ground. For instance, the invention is particularly advantageous when applied to agricultural tractors or again to military vehicles which are intended to move on all kinds of ground.

The chief object of the present invention is to provide a wheel of the type above referred to, including a rubber tire, for instance a pneumatic tire, which possesses a better adhesion to the ground, said ground consisting either of a road or of a broken surface, without requiring a change of wheel.

According to an essential feature of the present invention, this wheel is fitted with an auxiliary annular part or support carrying a plurality of removable blades or the like which can be mounted and fixed radially in either of two different positions, to wit: a working position in which they project outwardly with respect to the tire, and a position of rest in which they are retracted with respect to said tire.

A feature of the invention lies in the fact that each blade is wedge-shaped and engages in a housing or groove provided in the annular part (of the wheel) and having sides which converge toward the central part of the wheel with the same inclination as the wedge, in such manner that the blades are secured by a wedging effect automatically obtained as a consequence of the effort applied to the blade as it is being driven into the ground.

Another feature of the present invention consists in the provision of means for opposing the lateral stresses that may be undergone by the blades when in action.

According to an advantageous embodiment of the present invention, each blade includes two portions constituting two wedges opposed to each other along their common base and symmetrical with reference to a median plane, in such manner that the wheel can be used either on left hand side wheels or on right hand side wheels.

The sides of each blade are symmetrically inclined with respect to the common base of the two wedges, that is to say make the same angle with said base, which permits of wedging either one end or the opposite end of the blade into its housing, for placing it in the position of rest or in the position of work, respectively.

Furthermore, according to another feature of the invention, each blade is provided with a median groove extending in the radial direction, said groove or slot being adapted to cooperate with a fixation bolt which engages therethrough and being provided with widened parts at both of its ends for the passage of said fixation bolt, which needs not be fully unscrewed for permitting the removal of the blade or its insertion in position.

Other features of the present invention will result from the following detailed description of some specific embodiments thereof.

Preferred embodiments of the present invention will be hereinafter described, with reference to the accompanying drawings, given merely by way of example, and in which:

Fig. 1 is an elevational view of the auxiliary annular element which supports the blades and which is supposed to be fitted on a wheel carrying a pneumatic tire;

Fig. 2 is a corresponding sectional view on the line 2—2 of Fig. 1;

Fig. 3 is a front elevational view, on an enlarged scale, of one of the blades to be fitted in said annular element;

Fig. 4 is a sectional view on the line 4—4 of Fig. 3;

Fig. 5 is a diagrammatic elevational view showing, in its upper part, the fitting of the blades in retracted position, which corresponds to the position of rest, and in its lower part, the fitting of the blades in the projecting position, which corresponds to the working position;

Fig. 6 is a diagrammatic sectional view on the line 6—6 of Fig. 5;

Fig. 7 is a partial sectional view analogous to Fig. 6, but corresponding to another embodiment of the invention.

The wheel 1 which is shown in the drawings (Figs. 1, 2, 5 and 6) includes a tire 2, either pneumatic or of another kind, fitted on a rim made of two parts: to wit, a half-rim 3 rigid or integral with the web 1 and a half-rim 4 secured thereto in any suitable manner. The elements for increasing the adhesion of the wheel are carried by this half-rim 4, through the intermediate of the annular support 5.

In the embodiment shown by the drawings, support 5 is constituted by a circular part fixed to half-rim 4 by means of hooks 6 which bear upon the back face of a flange 4a of rim 4 and extending through holes provided in lugs 5a of annular part 5. Nuts 7 screwed on these hooks 6 keep annular part 5 in position. The correct axial positioning of said annular part 5 is ensured by means of a cylindrical bearing 4b.

Annular member 5 is provided with grooves 8 formed when casting the member in question and extending radially with respect thereto. These grooves or housings 8 have convergent sides 9 and are intended to receive blades 10 (Figs. 3 and 4) which will be hereinafter described. Along the axial line of these housings 8 I provide studs 11 rigid with the annular member 5 and adapted to receive the tightening nuts 12 of the blades (Figs. 5 and 6).

Furthermore, small plates 13 are fixed in any suitable manner to the bosses 14 which separate housings 8 from one another and in the part thereof that is nearer to the center of the wheel. These small plates 13, which project slightly from the sides 9 of housings 8, are intended to reduce the stress supported by studs 11, and also to prevent the lateral pivoting of the blades in the eventuality of nuts 12 being loosened.

In the housings 8 of annular member 5 which has just been described, I introduce blades 10, which are shown on an enlarged scale in Figs. 3 and 4. These blades 10 are generally utilized in the state in which they are when they have just been cast. As shown by the drawings, they are of U-shaped section, the wings 10a being symmetrical with respect to the plane of section of Fig. 4. They have the shape of two wedges opposed along their base ab. The sides ac and cd of these wedges make with thier base ab angles α equal to each other and equal to the inclination of the sides 9 of the housings 8 of annular member 5. It follows that these blades can have either of their ends engaged in housings 8, either in the position of rest, the point of the blade being turned toward the center, as shown by the upper part of Figs. 5 and 6, or in the position of work, the point being turned outwardly, as shown by the lower part of the same figures.

If angle α is suitably chosen, it will be readily understood that it is possible automatically to obtain a strong wedging of the blade in its housing as a consequence of the effort applied to the blade when it is penetrating into the ground. Furthermore, the blade includes a radial median groove or slot 15 affording a passage for bolt 11 and widened at both ends, at 15a and 15b, in such manner as to permit of removing the blade or inserting it in position without involving the necessity of removing the nut, since the latter can pass freely through said parts 15a and 15b. When the blade is fixed in either of its positions in groove 8, this nut 12 bears upon the edges 16 of slot 15. Furthermore, the end 10b or point of the blade is prolonged transversely, so as to overlap a portion of the tire, as shown by the lower part of Fig. 6.

As the blade made as above explained is symmetrical with respect to plane IV—IV (Fig. 3) it can be used at will either with a right hand side wheel or with a left hand side wheel. As its sides are symmetrically inclined with respect to the base a—b, it can be inserted in a housing 8 either in the position of rest or in the position of work.

If the vehicle is to run on solid ground, the blades are disposed in their positions of rest, that is to say with their points directed toward the center, by engaging nut 12 into aperture 15b, and wedging the faces corresponding to ac between the sides 9 of housings 8. Then the blades are secured in this position by tightening nut 12.

On the contrary, if the vehicle is to move on soft or broken ground, nuts 12 are loosened, each blade is caused to slide radially toward the outside, and then it is removed and inserted into the corresponding housing after having turned the points outwardly. In this position, the ends such as ad of the wedge are engaged between the sides 9 of housings 8. The fixation of each of the blades in position is obtained by means of a nut such as 12. As above set forth, the blades are held in position by wedging when the vehicle is moving. Even if nut 12 gets loose, for any reason, the blade cannot turn laterally (that is to say about an axis parallel to ab) because the combined action of plates 13 and nuts 12 opposes lateral stresses when in service.

Of course, the arrangement above described merely by way of example, is not the only possible one according to the present invention. In particular, instead of having an annular member 5 which is secured to the half-rim 4, I may, as diagrammatically shown by Fig. 7, make use of a half-rim 4' made in such manner as to have, integral therewith along its periphery, an annular part 5' which is a part of the rim and is shaped like annular member 5 above described for receiving blades 10.

Furthermore, it will be understood that the invention includes all blades having a double wedge, independently of the annular part that is to support them, these blades being eventually mounted directly upon the wheel in any suitable manner.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. In connection with a vehicle having a hub and a tire the combination of an annular part coaxially carried by said wheel and of a diameter intermediate between the outer diameters of said hub and said tire respectively, said annular member being provided with a plurality of housings extending therethrough, each of said housings having its two axially extending sides convergent toward the center of the wheel; a plurality of blades adapted to be removably engaged in said housings respectively so as to be all located in a common plane at right angles to the axis of said wheel, said blades being in the form of a double wedge, pointed at one end and truncated at the other, so that when engaged in said housings with their pointed ends outwardly they project from the outer periphery of said rim and when engaged in the opposed direction, the truncated ends are retracted with respect to said periphery, the inclination of the edges of said blades that engage in said housings being the same as that of the sides of said housing so that said blades wedge in their respective housings, the blades being provided with median slots parallel to the length thereof; bolts carried by said annular part extending through said slots respectively, nuts screwed on said bolts respectively and applied against the edges of said slots, for fixing said blades in said housings; and small plates carried by said annular part and extending at least partly on the lateral side of said housings respectively.

2. An anti-skid attachment for a road vehicle wheel having a tread surface, which comprises a ground gripping member substantially in the form of a truncated lozenge so as to have two couples of oppositely converging sides, one couple of said sides extending from the lozenge center to a considerably greater distance than the second couple to form a ground engaging tip portion; and a rigid ring of considerably less diameter than the wheel tread surface, including an encasing housing for the ground gripping member with oppositely positioned, bearing walls which converge toward the center of the ring— by the same angle as the opposite lozenge side in each couple, so that the ground gripping member may be jammed in the housing in either of two opposite positions.

3. In a road vehicle wheel having a tread surface, the combination of a ground gripping member having a ground contacting tip portion and a heel portion, the heel portion including opposite sides which converge away from the tip portion; and a support rigid with the wheel, wholly positioned intermediate the tread surface and the center of the wheel and comprising a groove therein with opposite sides converging, by the same angle as the heel portion sides, toward the wheel center part, for accommodating said heel portion in jammed condition therein; and means for retaining the ground gripping member heel portion on the support against axial displacement, including a releasable, axially positioned member operatively engaging said heel portion, removably connected with said support and a second member positioned in radially spaced apart relationship with respect to the releasable member, said second member being rigid with the support and extending over the groove to form an abutment preventing axial movement of the heel portion of the ground gripping member.

4. In a road vehicle wheel having a side annular support which has an outer diameter less than that of the tread surface of the wheel, the support being provided in its exposed face with a radial groove having outwardly flaring opposite edges, the combination of a ground gripping member having a heel portion with tapering edges to cooperate with the flaring edges of the groove in the support, and a tip portion adapted to outwardly project with respect to the wheel tread surface, the exposed face of the gripping member being so stepped as to define a marginal exposed bead and a median portion with an aperture therein in sunken position with respect to the marginal bead; axially positioned transfixing means including an inner portion which passes through said aperture and an enlarged outer portion which engages the median portion of the gripping member in sunken position with respect to the marginal bead, for retaining the gripping member on the support against axial movement away from the wheel; and a small plate rigid with the support and positioned thereon to extend over the groove in radially spaced apart relationship with respect to the transfixing means.

MARCELLIN EUGÈNE RENÉ BERNARDON.